United States Patent
Piasecki et al.

(10) Patent No.: US 11,866,163 B1
(45) Date of Patent: Jan. 9, 2024

(54) LOW-DRAG TAIL ROTOR FOR A COMPOUND AIRCRAFT

(71) Applicant: Piasecki Aircraft Corporation, Essington, PA (US)

(72) Inventors: Frederick W. Piasecki, Haverford, PA (US); Dinesh Barwey, Chandler, AZ (US); Shane A. Lewis, West Chester, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 0 days.

(21) Appl. No.: 17/701,472

(22) Filed: Mar. 22, 2022

Related U.S. Application Data

(60) Provisional application No. 63/165,822, filed on Mar. 25, 2021.

(51) Int. Cl.
  *B64C 27/82* (2006.01)
  *B64C 27/26* (2006.01)

(52) U.S. Cl.
  CPC .............. *B64C 27/82* (2013.01); *B64C 27/26* (2013.01); *B64C 2027/8227* (2013.01); *B64C 2027/8236* (2013.01); *B64C 2027/8272* (2013.01)

(58) Field of Classification Search
  CPC ............ B64C 27/82; B64C 2027/8209; B64C 2027/8227; B64C 2027/8281; B64C 2027/8263; B64C 27/22; B64C 27/26
  See application file for complete search history.

(56) References Cited

U.S. PATENT DOCUMENTS

| 3,744,742 A | 7/1973 | Gear |
| 9,592,899 B2 | 3/2017 | Fink |
| 2005/0045762 A1* | 3/2005 | Pham .................... B64C 27/26 244/7 R |

FOREIGN PATENT DOCUMENTS

EP   3464061 B1   10/2019

OTHER PUBLICATIONS

Rick James, "Helicopter Tail Rotors—The Different Types Explained," "Pilot Teacher" webiste, https://pilotteacher.com/helicopter-tail-rotors-the different-types explained/, accessed Mar. 22, 2022.
Aerovelco, "Flexrotor Ephyra flies Hood Techology's big "MWIR" nose," YouTube video, https://www.youtube.com/watch?v=H63ZzhqrH2M, published Apr. 17, 2017 (See.07 and .41).

* cited by examiner

*Primary Examiner* — Timothy D Collins
*Assistant Examiner* — Justin Michael Heston
(74) *Attorney, Agent, or Firm* — Robert J. Yarbrough; Lipton, Weinberger & Husick

(57) ABSTRACT

A parking tail rotor for a rotary wing aircraft stops rotating at a high forward aircraft speed when aircraft control surfaces have adequate control authority to balance main rotor torque without the rotating tail rotor. When stopped, the blades of the parking tail rotor move due to the force of the relative wind to a parked position in which the span of the blades extend in the aft direction, reducing air resistance to the forward motion of the aircraft.

20 Claims, 12 Drawing Sheets

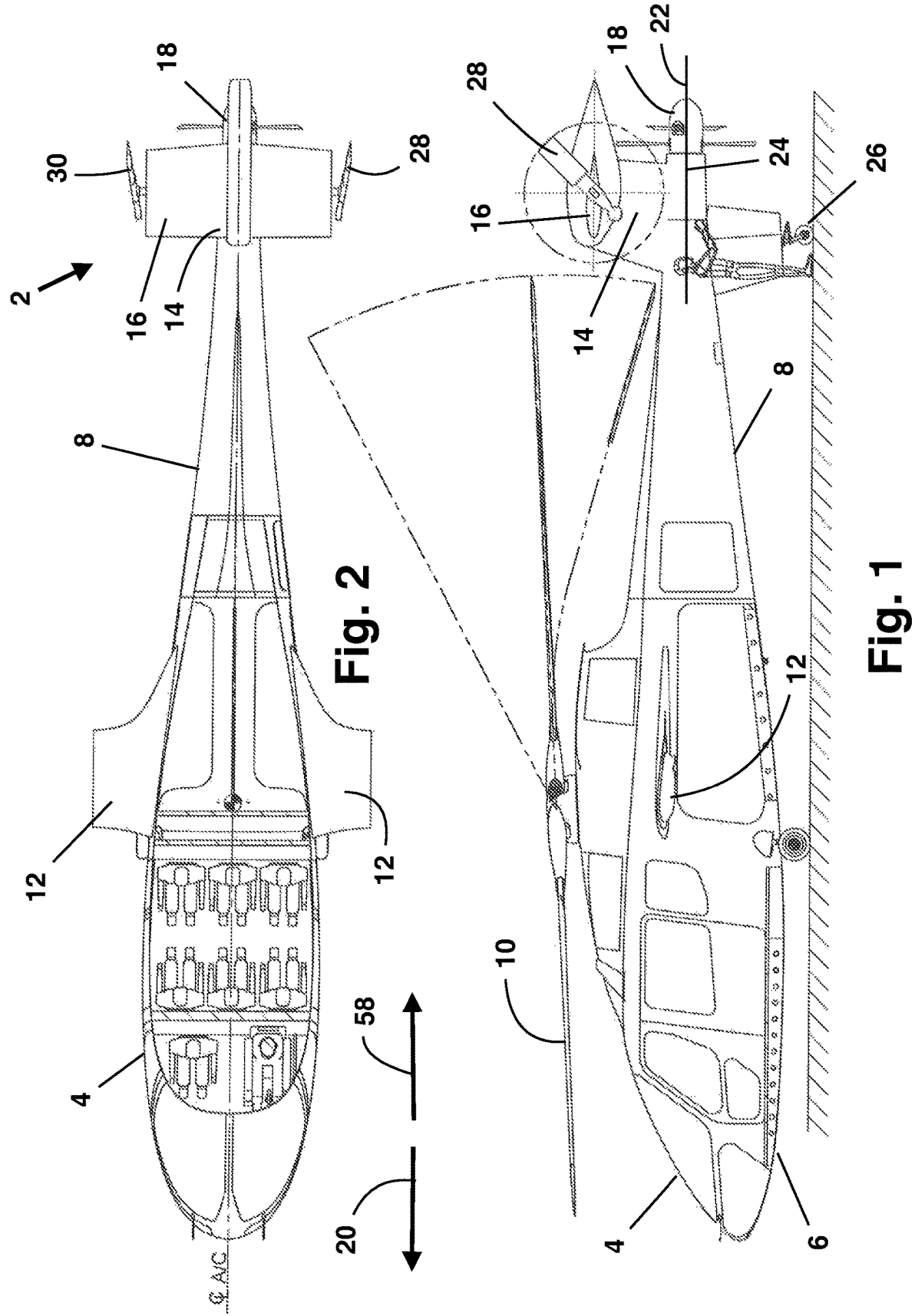

LOW-DRAG TAIL ROTOR FOR A COMPOUND AIRCRAFT

I. BACKGROUND OF THE INVENTION

A. Field of the Invention

The Invention is a parking tail rotor for a rotary wing aircraft, such as a compound aircraft. In hover and at low forward speeds, the blades of the tail rotor rotate to balance the torque from the main rotor. At high forward speeds, the tail rotor blades stop and passively park in the downwind direction to reduce parasitic drag.

B. Statement of the Related Art

A compound aircraft has features of both a fixed wing aircraft and a rotary wing aircraft. A powered rotor provides lift to keep the compound aircraft aloft in hovering and low speed flight. The main rotor may feature cyclic and collective pitch control, allowing the aircraft to rise vertically from the ground and maneuver in the same manner as a conventional helicopter. A fixed wing provides lift due to relative wind moving across the fixed wing when the compound aircraft moves in the forward direction. Lift from the fixed wing provides some or all of the lift required to keep the aircraft airborne at high forward speeds.

For a prior art helicopter or compound aircraft, the tail rotor is mechanically tied to the main rotor and continues to rotate whenever the main rotor is rotating. The continuously rotating prior art tail rotor generates significant parasitic drag as the prior art aircraft travels through the air in the forward direction. The continuously rotating tail rotor also requires power to turn the prior art tail rotor at its design rotational speed, consuming aircraft energy resources and reducing aircraft power available for other uses.

The prior art does not teach the low-drag tail rotor of the Invention.

II. BRIEF DESCRIPTION OF THE INVENTION

A compound aircraft having the parking tail rotor of the Invention may include a main rotor, a fixed wing, a thruster propeller, and two spaced-apart tail rotors disposed on opposing ends of a horizontal stabilizer or elevator on the tail boom of the aircraft. Each of the two tail rotors has only one blade. The two blades rotate about a common tail rotor axis of rotation and rotate in the same direction. The tail rotor axis of rotation is oriented horizontally and normal to the longitudinal axis of the fuselage. Each of the two blades has a counterweight integral with the spar of the blade, with the blade disposed on one side of the tail rotor axis of rotation and the counterweight disposed on the opposite side of the tail rotor axis of rotation. The purpose of the counterweights is to balance the weight of each rotor blade to reduce vibration normal to the axis of rotation. The axially spaced-apart relation of the two single blades effectively increases the disc area of each rotor so that for a given force output of the two blades, the resulting disc loading is lower than for a single tail rotor having two blades.

As the forward speed of the compound aircraft increases, the lift provided by the fixed wing increases and the lift and resulting torque provided by the main rotor decreases. Because the torque from the main rotor decreases, the force required from the tail rotor blades to balance the torque of the main rotor also decreases. With increased speed, the rudder of the compound aircraft increases in control authority until the rudder has adequate authority to both balance the remaining torque from the main rotor and to provide control moments for yaw control to the aircraft. At high forward speed, the tail rotor blades are not needed to balance main rotor torque or for control of the aircraft and are powered down and stopped. The force of the relative wind on the tail rotor blades passively rotates the blades until both blades are in a parked position with the two rotor blades extended in the aft direction parallel to the longitudinal axis of the fuselage and the counterweights extended in the forward direction. In the parked position, the parasitic drag of the two tail rotors is substantially less than the parasitic drag of a prior art single tail rotor having a direct mechanical drive that continues to rotate with the main rotor.

When the compound aircraft is moving at high forward speed and the fixed wing substantially or completely supports the weight of the aircraft, the main rotor may slow to a rotational speed just adequate to maintain the aero-mechanical stability of the main rotor blade, reducing main rotor profile power and reducing drag from the main rotor.

When the compound aircraft slows, the control authority of the rudder will decrease and the torque from the main rotor will increase. To compensate for the reduced control authority from the rudder and to balance the increased torque from the main rotor, the two tail rotor blades are moved from the parked position and begin to rotate, countering the main rotor torque. The two tail rotor blades may be of variable pitch or fixed pitch. If the blades are fixed-pitch, then the force applied by the two tail rotor blades to balance the main rotor torque is determined by the speed of rotation of the two tail rotors. If of variable pitch, then the force applied by the two tail rotors is determined by a combination of the selected pitch and the rotational speed. The fixed-pitch blades provide improved reliability, reduced cost, reduced complexity and reduced weight compared to the variable pitch blades. The variable pitch blades provides additional control options and a unique level of control redundancy.

Each of the two tail rotor blades has a flapping hinge so that each rotor blade may teeter or flap normal to the axis of rotation. Flapping of the tail rotor blades allows the blades to move in response to external inputs, such as a wind gust, without excessively loading the tail rotor hubs and bearings. When the tail rotor blades are rotating to balance the main rotor torque, the centrifugal force of the spinning blades and counterweights resists the flapping movement. If a blade is perturbed, as by a wind gust, then the centrifugal force of the rotating tail rotor will return the blade and counterweight to a position normal to the axis of rotation. The aerodynamic center of each tail rotor blade is located on the blade side of the flapping hinge axis. When the rotational speed of the tail rotors becomes low, the force of the relative wind on the aerodynamic center dominates other forces and the tail rotor blades move so that the tail rotor blades stably are oriented downwind in the parked position.

The two tail rotor blades may rotate with the same radial orientation, so that when the first blade is oriented in the aft direction the second blade also is oriented in the aft direction. Alternatively, the two tail rotors may rotates 180 degrees apart in radial opposition, so that when the first blade is oriented in the aft direction the second blade is oriented in the forward direction. Orienting the blades in opposite directions may reduce vibration by balancing the lift of the two tail rotor blades about the axis of rotation. In concert with this benefit, the wind velocity in the wake of one tail rotor blade can be recovered by the opposite tail rotor blade.

The two tail rotor blades may be powered by a single electric motor or may be powered by two individual electric motors. The two tail rotor blades also may be powered by a mechanical drive shaft from the from the engine, motor, or other power source powering the main rotor.

In a first embodiment, two single-bladed tail rotors are disposed at either end of a horizontal stabilizer on the tail boom of a compound aircraft. The compound aircraft also includes a fuselage, a main rotor, a fixed wing, a thruster propeller and a vertical stabilizer and rudder. The horizontal stabilizer is disposed at the top of the vertical stabilizer. Placing the horizontal stabilizer at the top of the vertical stabilizer as opposed to lower on the tail boom provides that the center of thrust of the two tail rotors will be similar in elevation to the disc of the main rotor, reducing the tendency of the force applied by the tail rotors to cause the aircraft to roll compared to tail rotors located lower on the tail boom.

In the first embodiment, the first blade and the second blade are directly driven through a common driveshaft by a single electric motor centrally located within the outer mold line ('OML') of the vertical stabilizer. The first and second blades rotate in unison in the same radial orientation. The two blades do not rotate separately from the drive shaft and are directly attached to the drive shaft, as by splines, flanges, threaded fasteners, keys or pins. When electric power to the electric motor is cut at high forward speed, the two blades will slow and stop. The relative wind on the two blades then pushes the two blades in the aft direction. The force of the relative wind on the two blades in turn applies a torque to the drive shaft, which applies the torque to the electric motor, turning the electric motor and the drive shaft until the two blades are in the parked position. When the aircraft slows and power is restored to the electric motor, the electric motor causes the drive shaft and the two blades to rotate to balance the main rotor torque.

A second embodiment is the same as the first embodiment, except that the two blades rotate 180 degrees out of phase in radial opposition driven by a single drive shaft. In the second embodiment, the two tail rotors are not rigidly attached to the drive shaft and the two blades and counterweights are rotatable about the axis of rotation separately from the drive shaft. The drive shaft includes a first and second driving boss corresponding to the first and second blades, with the two driving bosses disposed 180 degree apart on opposite sides of the drive shaft. When the electric motor turns the two bosses, each boss engages the trailing side of a driven boss attached to one of the two blades. The driving bosses push the corresponding blades and counterweights so that the blades and counterweights rotate about the tail rotor axis of rotation and balance the main rotor torque.

When power to the second embodiment electric motor is cut at high forward speed, rotation of the two blades will slow and stop. One of the blades will be in the advancing position and the other will be in the retreating position. The blade in the retreating position is unrestrained by its driving boss and will move freely under the force of the relative wind until the rotor blade extends in the aft direction in the parked position. The blade in the advancing position has two forces acting on it—the relative wind pushing the blade in the reverse direction toward the parked position, and the driving boss resisting motion in the reverse direction due to the inertia and friction of the drive shaft and electric motor. The force of the relative wind pushing on the advancing position rotor blade will overcome the resistance of the driving member, drive shaft and motor. The force of the relative wind will push the advancing position blade until the rotor blade is in the parked position.

A third embodiment is the same as the first embodiment, except that two electric motors are provided, with each of the electric motors driving one of the blades. Each electric motor may be located at the corresponding tail rotor to eliminate the drive shaft. The electric motors may be synchronous motors that are 180 degrees out of phase and that rotate in the same direction, so that the two blades rotate in radial opposition.

A fourth embodiment is the same as the second embodiment, except that the tail rotor drive system includes a clutch, such as an electric clutch, that disengages the drive shaft from the electric motor or the blades from the drive shaft when the electric power is cut to the electric motor. The electric clutch reduces the resistance of the driving boss so that the relative wind will more easily push the advancing blade to the parked position.

A fifth embodiment is the same as the second embodiment, except that the two blades are not disposed at opposing ends of the horizontal stabilizer. The two blades are located adjacent to one another and driven by a common drive shaft. The two tail rotors rotate 180 degrees out of phase in radial opposition as does a conventional two-bladed tail rotor. Because the two tail rotor blades are immediately adjacent on the common drive shaft, the requirement for the counterweights is reduced. As for the second embodiment, when the power is cut to the electric motor, the two blades slow and stop. The blade in the retreating position moves freely to the parked position under the pressure of the relative wind. The blade in the advancing position is pushed to the parked position by the relative wind overcoming the resistance of the driving boss, the drive shaft and the electric motor, as described above for the second embodiment.

A sixth embodiment is a single tail rotor having two opposing tail rotor blades. The two opposing tail rotor blades are joined by a flapping hinge and each tail rotor blade is joined to the flapping hinge by a lead-lag hinge. When the tail rotor is rotating under power, centrifugal force keeps the two tail rotor blades in the extended, or operating, position. When the blades slow and stop at high aircraft forward speed, the force of the relative wind on the two blades moves the blades to the parked position in which the blades extend in the aft direction parallel to each other and to the aircraft longitudinal axis.

In a seventh embodiment, a first blade is connected to a second blade by a lead-lag hinge and the second blade is connected to a driveshaft by a flapping hinge. When the driveshaft applies rotary power to the second blade, the second blade rotates and pulls the first blade with it. Centrifugal force maintains the first blade in the deployed position so that both the first and second blades balance the main rotor torque. When power is cut to the driveshaft at high forward aircraft speed, the force of the relative wing pushes the second blade to the parked position. The force of the relative wind causes the first blade to rotate about the lead-lag hinge so that the first and second blades are parallel and extend in the aft direction in the parked position. The first blade is offset away from the hub and driveshaft so that the first blade will not interfere with the second blade, the hub or the driveshaft when the first blade moves to and from the parked position. Because the first and second blades are not aligned, the first blade may include a counterweight to balance the first blade with respect to the second blade.

An eighth embodiment is similar to the seventh embodiment except that the spars of the first and second blades are aligned so that a counterweight is not necessary. In the eighth embodiment, centrifugal force holds the first blade in the deployed position when the first and second blades are rotating under power so that both the first and second blades balance the main rotor torque. When power to the blades is cut and the blades slow, a spring-loaded lifting link lifts the first blade outboard of the second blade. The relative wind moves the second blade to the parked position. In the raised position the first blade does not interfere with the second blade, the hub or the driveshaft. The force of the relative wind causes the first blade to rotate about the lead-lag hinge so that the first and second blades are parallel in the parked position.

All embodiments may include rotor blades of variable pitch or of fixed pitch. The flapping motion of each tail rotor blade about the flapping hinge may be controlled by a damper to prevent over-rapid excursion of the tail rotor blade flapping angle. The motion of the tail rotor blade about the flapping hinge may be biased, as by a spring, so that the span of the tail rotor blade is normal to the rotational axis of the tail rotor when tail rotor blade is rotating slowly or is stopped.

III. BRIEF DESCRIPTION OF THE DRAWINGS

FIG. 1 is a side view of the compound aircraft of the Invention.

FIG. 2 is a cutaway partial top view of the aircraft of the Invention.

IV. DESCRIPTION OF AN EMBODIMENT

Figure 3:
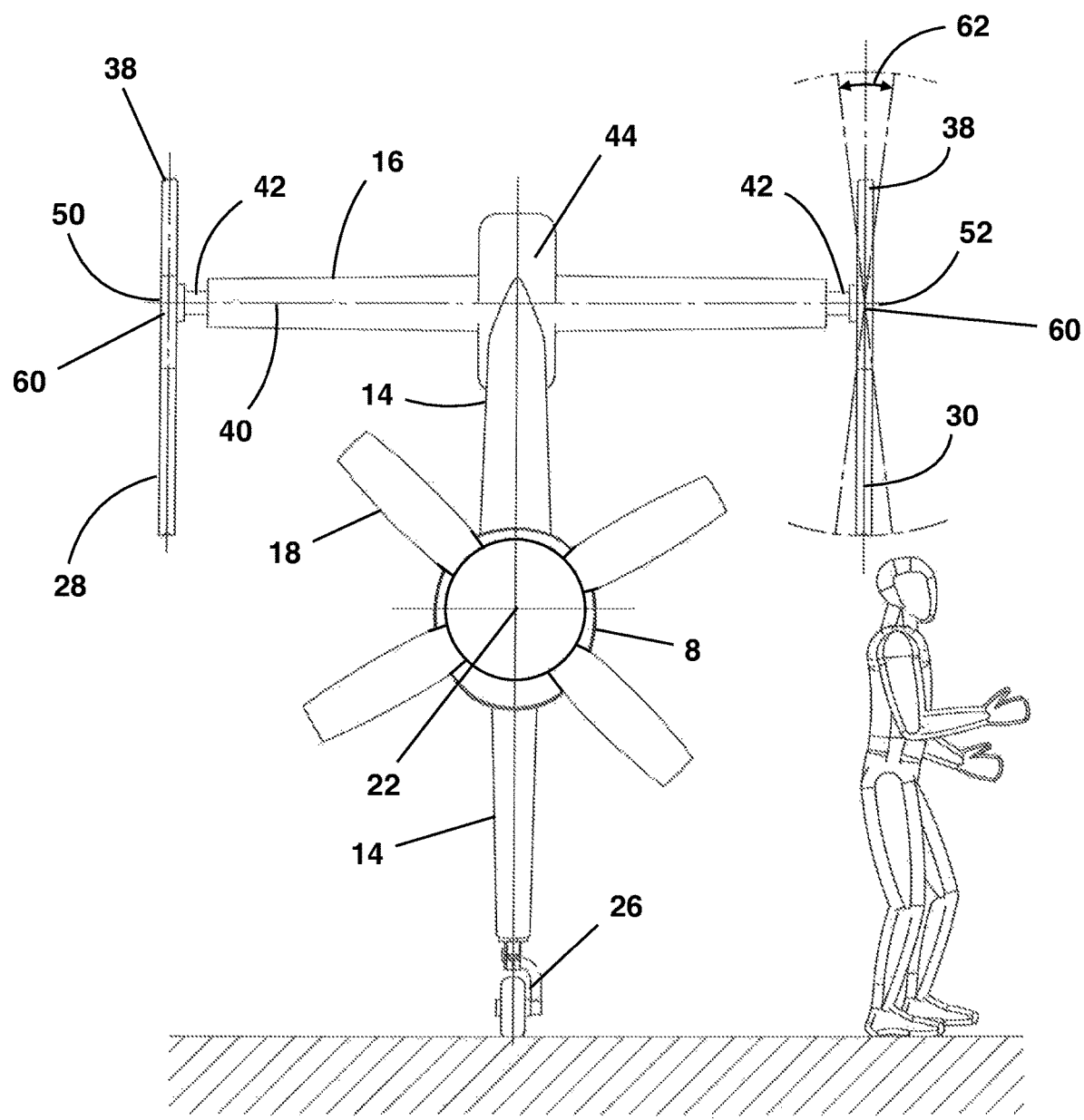
FIG. 3 is a back end view of the aircraft of the Invention.

The Invention is a parking tail rotor 2 for a rotary wing aircraft 4. From FIG. 1, the rotary wing aircraft 4 may be a compound aircraft that may include a fuselage 6, a tail boom 8, a main rotor 10 and a fixed wing 12. Attached to the tail boom 8 are a vertical stabilizer 14 that may include a rudder, a horizontal stabilizer 16 that may include an elevator, a thruster propeller 18 and the parking tail rotor 2. The main rotor 10 supports the rotary wing aircraft 4 in hovering and low speed flight. The parking tail rotor 2 balance the torque of the main rotor 10 to control yaw in hovering and low-speed flight. The thruster propeller 18 propels the aircraft 4 in the forward direction 20, although the aircraft 4 may dispense with the thruster propeller 18 and may depend on the main rotor 10 for forward thrust. The fixed wing 12 provides some or all of the lift to support the aircraft 4 in high-speed flight. The main rotor 10 may slow during high speed flight to reduce power consumption and drag while maintaining the mechanical stability of the main rotor 10.

FIG. 2 is a cutaway top view of the fuselage 6 showing the elements of FIG. 1 and also showing passenger and pilot seating and the relative locations of the fixed wing 12 and hub of the main rotor 10.

FIG. 3 is an end view of the aircraft 4 from the rear showing the thruster propeller 18, vertical and horizontal stabilizers 14, 16 and the parking tail rotor 2. A drawing of a person generally shows the relative sizes. The thruster propeller 18 rotates about a thruster propeller axis of rotation 22 aligned with the longitudinal axis 24 of the aircraft 4 (shown by FIG. 1). The vertical stabilizer 14 may be supported by tail boom landing gear 26 and in turn supports the tail boom 8. The vertical stabilizer 14 supports the horizontal stabilizer 16 above the tail boom 8. The first blade 28 and the second blade 30 of the parking tail rotor 2 are disposed at opposing ends of the horizontal stabilizer 16. The first and second blades 28, 30 are configured for rotation about a tail rotor axis of rotation 40. An electric motor 44 is located within the vertical stabilizer 14 and configured to drive the first and second blades 28, 30 through a common driveshaft 42

Figure 4:
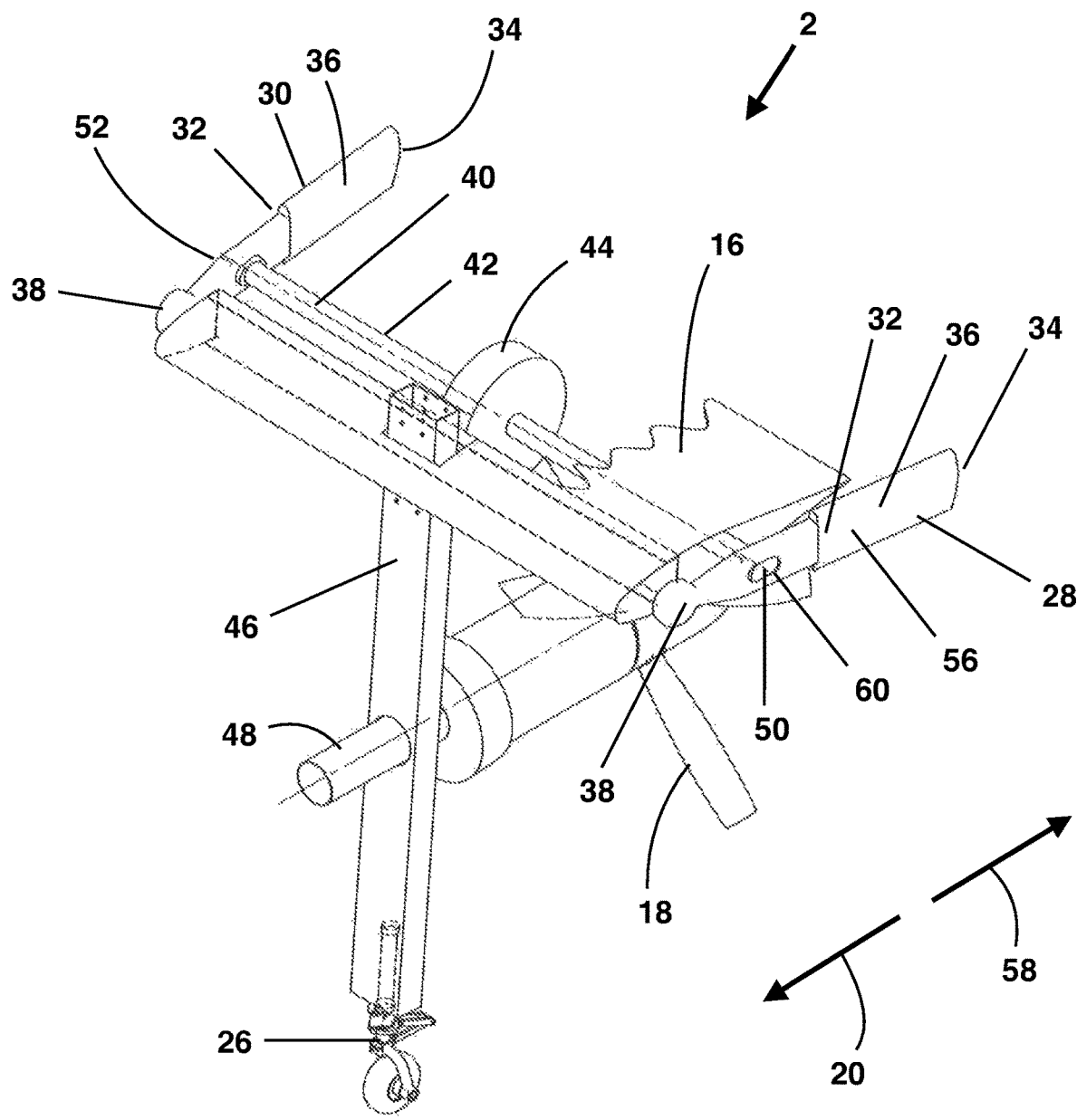
FIG. 4 is a detail cutaway perspective view of to tail rotors of the Invention in the parked position.

FIG. 4 is a cutaway perspective view of the parking tail rotor 2 drive system of the first embodiment. A first blade 28 and a second blade 30 are disposed at opposite ends of the horizontal stabilizer 16. Each of the first and second blades 28, 30 defines a blade root 32, a blade tip 34 and a blade span 36 between the root 32 and tip 34. Each of the first and second blades 28, 30 is attached to a counterweights 38. The first and second blades 28, 30 rotate about a common tail rotor axis of rotation 40. Each of the first and second blades 28, 30 is located on the opposite side of the tail rotor axis of rotation 40 from its corresponding counterweight 38. The counterweights 38 serves to reduce vibration from the first and second blades 28, 30. The first and second blades 28, 30 may both be driven by a common drive shaft 42 powered by tail rotor electric motor 44.

From FIG. 4, a structural member 46 provides structural support from the tail boom landing gear 26 to the tail boom 8 and supports the horizontal stabilizer 16 with respect to the tail boom 8 and hence with respect to the fuselage 6. The thruster propeller 18 may be driven by the same prime mover that drives the main rotor 10. Alternatively, the thruster propeller 18 may be driven by a separate electric motor. The electric motor for the thruster propeller may be located in the tail boom 8 proximal to the thruster propeller 18. Alternatively, the electric motor for the thruster propeller 18 may be located in the fuselage 6 nearer the aircraft 4 center of gravity and may drive the thruster propeller 18 through a thruster propeller drive shaft 48.

From FIG. 4, the tail rotor is rotated by a source of motive power, shown in FIG. 4 as a tail rotor electric motor 44 located intermediate to the first and second hubs 50, 52 and is disposed within the vertical stabilizer 14, which reduces the drag from air passing over the tail rotor electric motor 44. The tail rotor electric motor 44 turns the drive shaft 42, which passes through the horizontal stabilizer 16. A first blade 28 is located at the first end of the horizontal stabilizer 16. A second blade 30 is located at the second end of the horizontal stabilizer 16. Each of the first and second blades 28, 30 is attached to the drive shaft 42 by a flapping hinge 60 and is rotatable normal to the tail rotor axis of rotation 40. The flapping hinge 60 allows the first and second blades and and first and second counterweights 38 to flap in a range of motion 46 indicated on FIG. 3. Flapping of the blades 28, 30 allows the first and second blades 28, 30 to respond to perturbations, such as gusts of wind, without overtaxing the first and second hubs 50, 52 and bearings.

From FIG. 4, each of the first and second blades 28, 30 has a blade root 32, a blade tip 34, and a blade span 36 between the blade root 32 and blade tip 36. The first blade root 32 is attached to and rotates with a first blade hub 50 about a tail rotor axis of rotation 40. The second blade root 32 is attached to and rotates with a second hub 52 about the tail rotor axis of rotation 40. When the rotary wing aircraft 4 is flying in the forward direction 20 at a high speed, a flight control surface, which may be the vertical stabilizer 14 and rudder, may provide adequate control authority to balance main rotor 10 torque without rotating the first and second blades 28, 30. Power to the electric motor 44 is stopped, stopping the common driveshaft 42 and the first and second blades 28, 30. The force of the relative wind 54 blowing on the blade surface 56 of the first and second blades 28, 30 causes the first and second blades 28, 30 to rotate the common driveshaft 42 and the electric motor 44 until the blade span 36 of the first and second blades 28, 30 extends in the aft direction 58 in the parked position, reducing wind resistance of the first and second blades 28, 30. In the parked position, the blade tip 34 of each of the first and second blades 28, 30 is aft of the hub 50, 52 and blade root 32.

In the first embodiment of FIG. 4, the first and second blades 28, 30 rotate together in the same direction and with the same radial orientation; namely, during rotation when the first blade 28 is oriented in the aft direction 58 parallel to the aircraft longitudinal axis 24, the second blade 30 also is oriented in the aft direction 58 parallel to the aircraft longitudinal axis 24. FIG. 4 shows the parked position for the of all embodiments of the Invention—when aircraft 4 is moving in the forward direction 20 with the first and second blades 28, 30 stopped, both the first and second blades rotate due to the relative wind 54 until both the first and second blades 28, 30 are oriented in the aft direction 58, in the same manner that a weather vane rotates to a downwind position.

Figure 5:
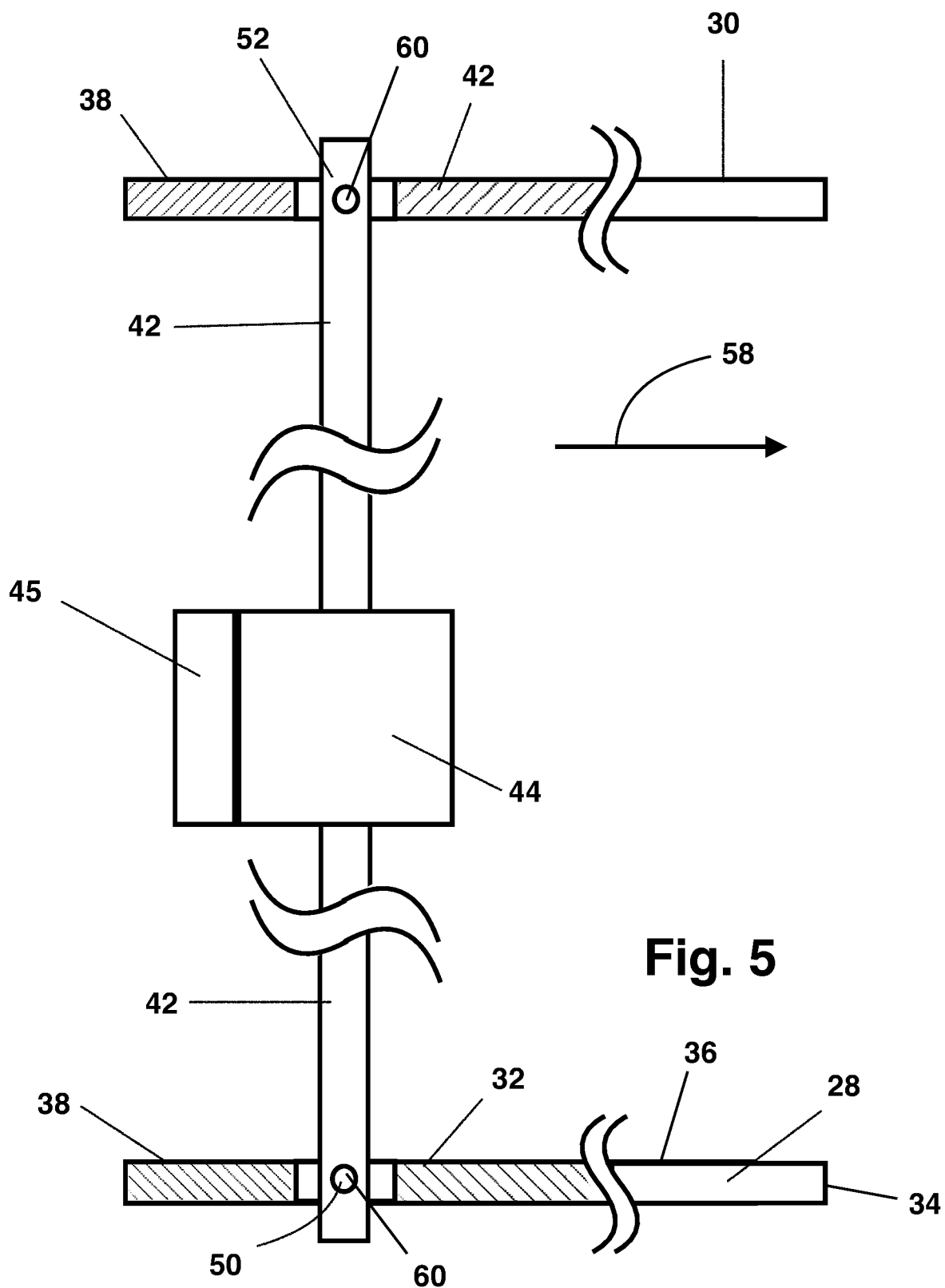
FIG. 5 is a schematic top cutaway view of the tail rotors of the first embodiment.

FIG. 5 is a schematic top cutaway view of the parking tail rotor 2 of the first embodiment. The centrally-located tail rotor drive motor 44 is supported by the structural member 46. The tail rotor drive motor 44 turns the drive shaft 42, which is in turn attached to the first blade 28 and second blade 30 through flapping hinge 60. The first and second blades 28, 30 are balanced by counterweights 38 to reduce vibration. The first and second blades 28, 30 are oriented in an equal radial orientation and rotate together—when the first blade 28 is oriented in the forward direction 20 parallel to the aircraft longitudinal axis 24, the second blade 30 also is oriented in the forward direction 20 parallel to the aircraft longitudinal axis 24. The flapping hinge 60 allows each of the blades 28, 30 to respond to perturbations, such as wind gusts, by moving through a flapping range of motion 62, shown by FIG. 3.

Figure 6:
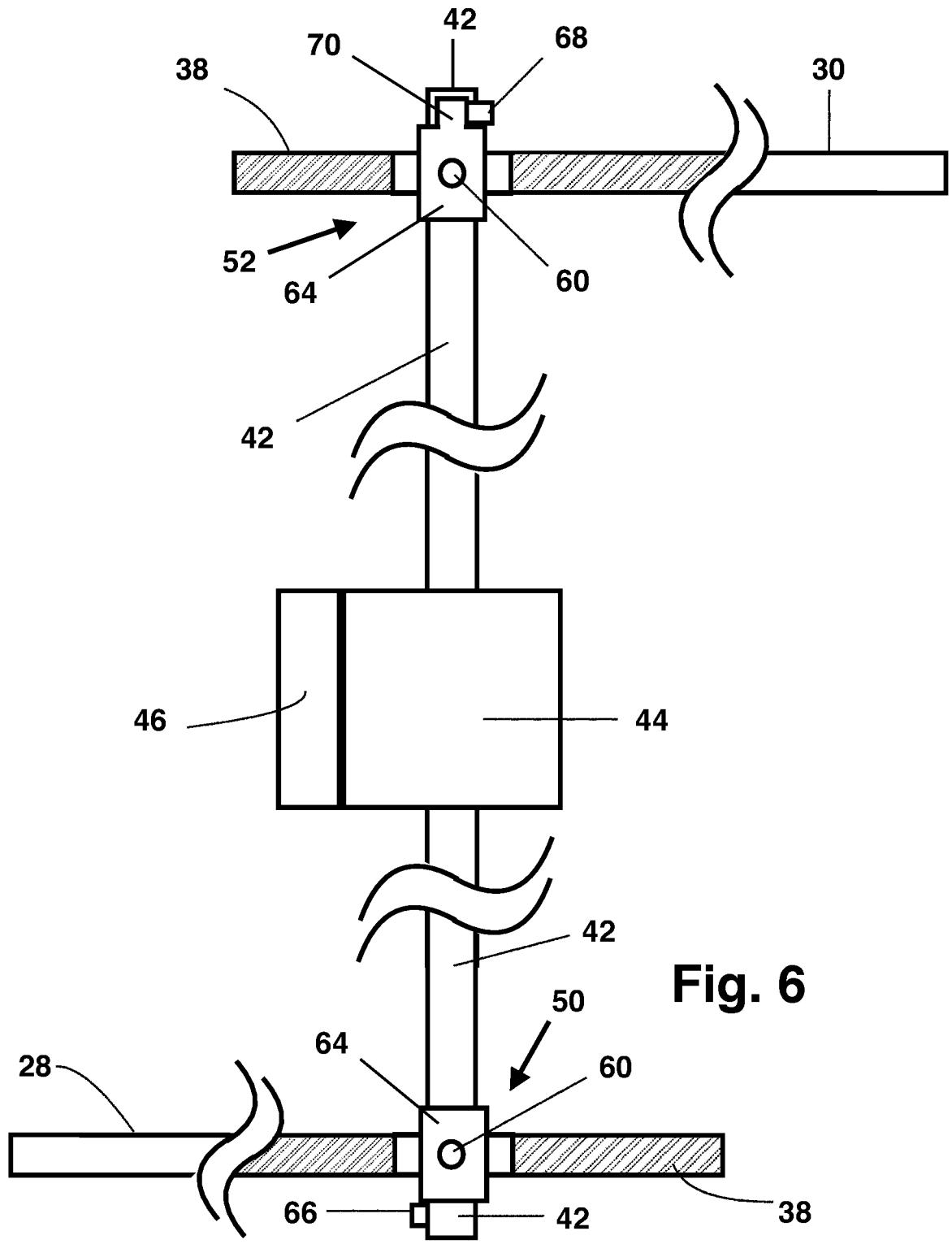
FIG. 6 is schematic top cutaway view of the tail rotors of the second embodiment.
Figure 7:
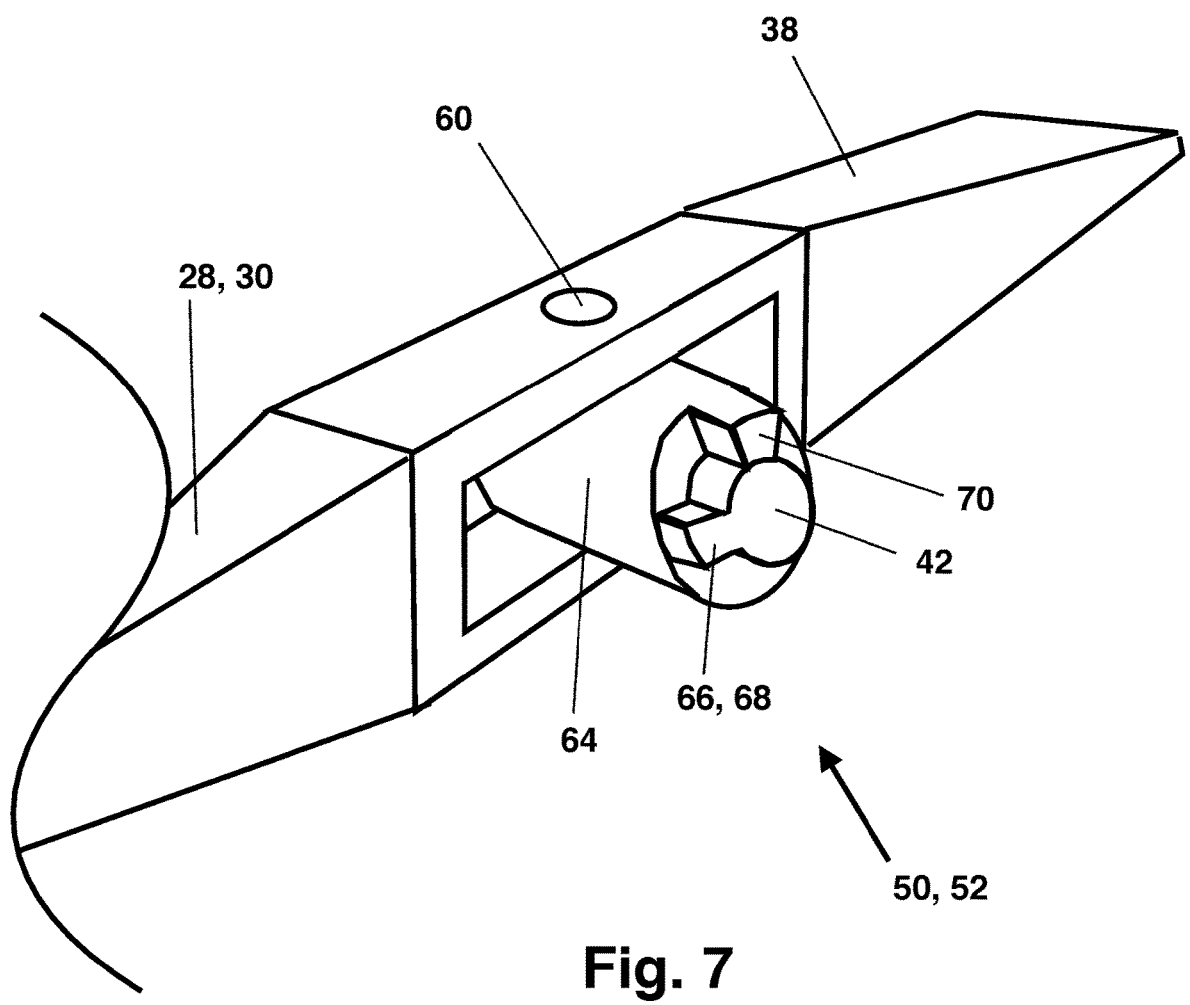
FIG. 7 is a detail of the embodiment of FIG. 6.

FIGS. 6 and 7 illustrate a second embodiment. The second embodiment operates in a similar manner to the first embodiment, except that when the first and second blades 28, 30 are driven by the driveshaft 42, the first and second blades 28, 30 rotate in radial opposition; namely, in 180 degrees out of phase. For example, when the first blade 28 is oriented in the aft direction 58, the second blade 30 is oriented in the forward direction 20. When the aircraft 4 is moving at high speed in the forward direction 20 and the first and second blades 28, 30 are stopped, both the first and second blades 28, 30 passively move under the force of the relative wind 54 to the parked position as shown by FIG. 4 with sboth the first and second blades 28, 30 oriented in the aft direction 58 parallel to the aircraft longitudinal axis 24.

From FIGS. 6 and 7, to achieve both flapping and passive movement to the parked position, each of the first and second blade 28, 30 and first and second counterweight 38 is attached to a sleeve 64 by the flapping hinge 60. Each sleeve 64 is annular to the drive shaft 42 and is rotatable with respect to the drive shaft 32. Each end of the common driveshaft 42 defines a driving boss 66, 68 and each sleeve defines a driven boss 70. When the common driveshaft 42 rotates under the power of the driveshaft electric motor 44, the first driving boss 66 on the common driveshaft 42 engages the a driven boss 70 on a sleeve 64, causing the first blade 28 to turn. The second driving boss 68 turns the driven boss 70 on the opposing sleeve 64, causing the second blade 30 to turn. The driving bosses 66, 68 and driven bosses 70, in combination, cause the first and second blades 28, 30 to be in radial opposition and 180 degrees out of phase when the first and second blades 28, 30 are turning under power.

From FIGS. 6 and 7, when the aircraft 4 is moving in the forward direction 20, one blade 28, 30 is advancing against the relative wind 54 and the other blade 28, 30 is retreating from the relative wind 54. At high forward speed and when the power is cut and the first and second blades 28, 30 slow to a stop, the blade 28, 30 that is in the retreating blade position disengages from the driving boss 66, 68 and moves freely to the parked, downwind position in response to the relative wind 54. The blade 28, 30 that is in the advancing or upwind position remains in engagement with the driving boss 66, 68 of the drive shaft 42. The force of the relative wind 54 on the blade 28, 30 in the advancing position causes the driven boss 70 to push on the driving boss 66, 68, which causes the drive shaft 42 and tail rotor electric motor 44 to rotate in the reverse direction until the blade 28, 30 in the advancing position moves to the parked position shown by FIG. 4. Although the driving mechanism in FIGS. 6 and 7 is shown as pairs of bosses 66, 68, 70, any mechanism capable of pushing on the trailing edge side of the separately-rotatable first and second blades 28, 30 is suitable, such as an arm or crank.

Figure 8:
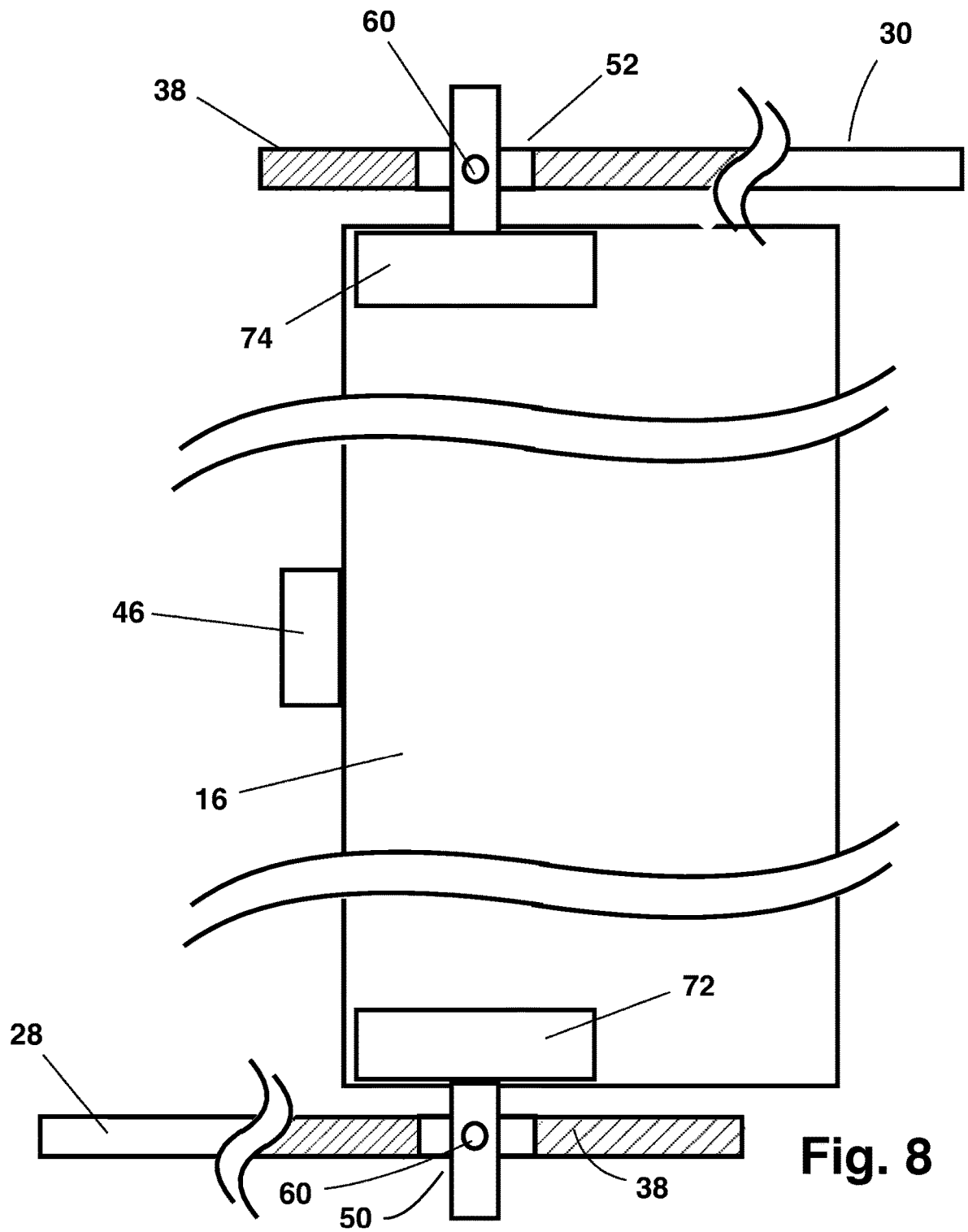
FIG. 8 is a schematic top view of tail rotors of the third embodiment.

FIG. 8 shows a third embodiment in which the first and second blades 28, 30 rotate in radial opposition. The first blade 28 is driven by first synchronous motor 72 and the second blade 30 is driven by second synchronous motor 74. Synchronous motors 72, 74 are driven at the same frequency and 180 degrees out of phase, causing the first and second blades 28, 30 to rotate at the same speed and in radial opposition.

Figure 9:
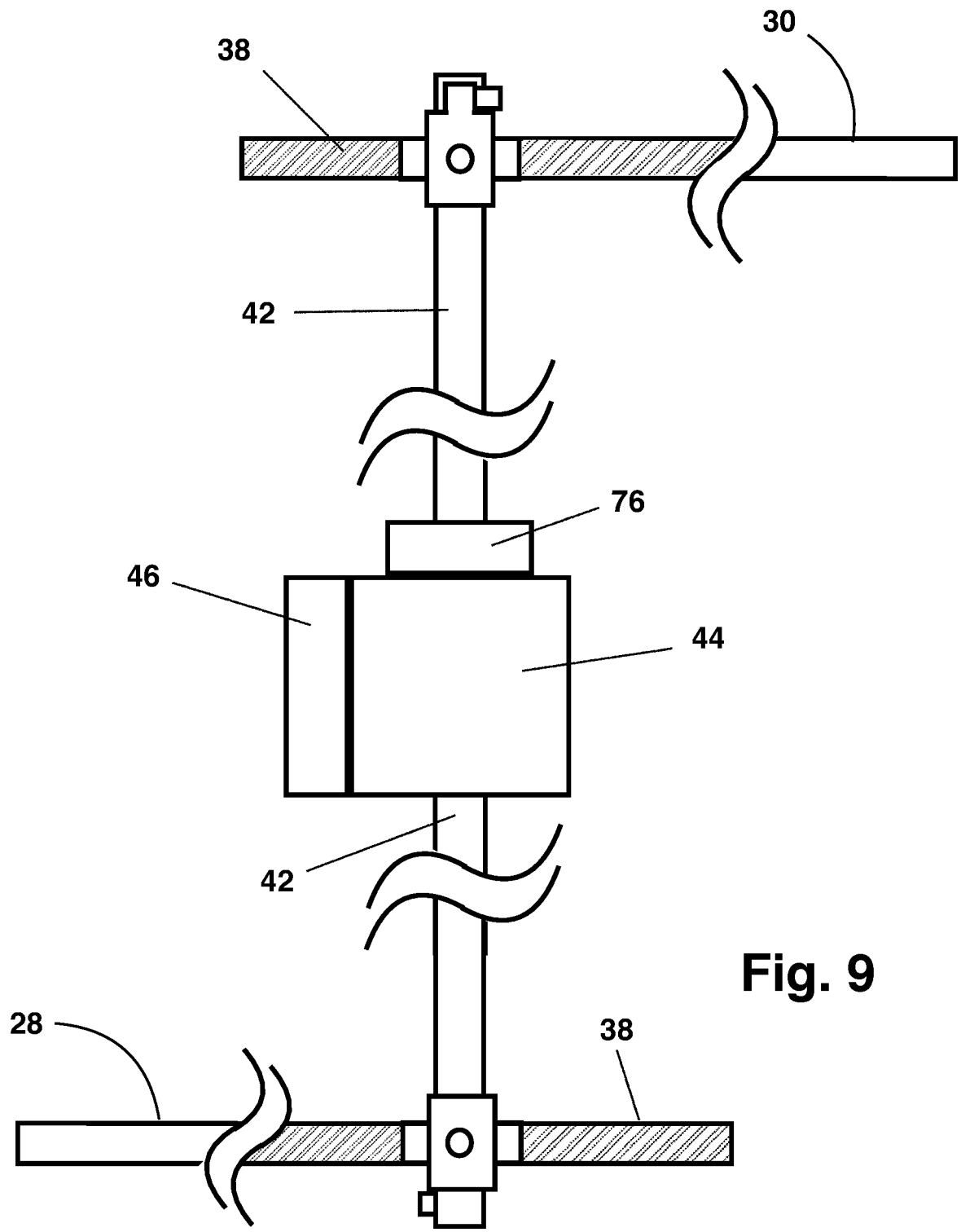
FIG. 9 is a schematic top view of the tail rotors of the fourth embodiment.

FIG. 9 shows a fourth embodiment featuring a clutch, such as an electrical clutch 76. The electrical clutch 58 selectably disconnects the drive shaft 32 from the electric motor 44. The tail rotor system 18 of FIG. 9 is otherwise the same as that of FIGS. 6 and 7. The electrical clutch 76 eliminates the resistance of the motor 44 to movement of the stopped first or second blade 28, 30 in the advancing position to the parked position in response to the relative wind 54. The clutch 76 may be be used with any of the embodiments to aid movement of the first and second blades 28, 30 to the parked position. Alternatively, the electric clutch 76 may disconnect one or both first and second blades 28, 30 from the common drive shaft 42, all to assist in moving the first and second blades 28, 30 to the parked position.

Figure 10:
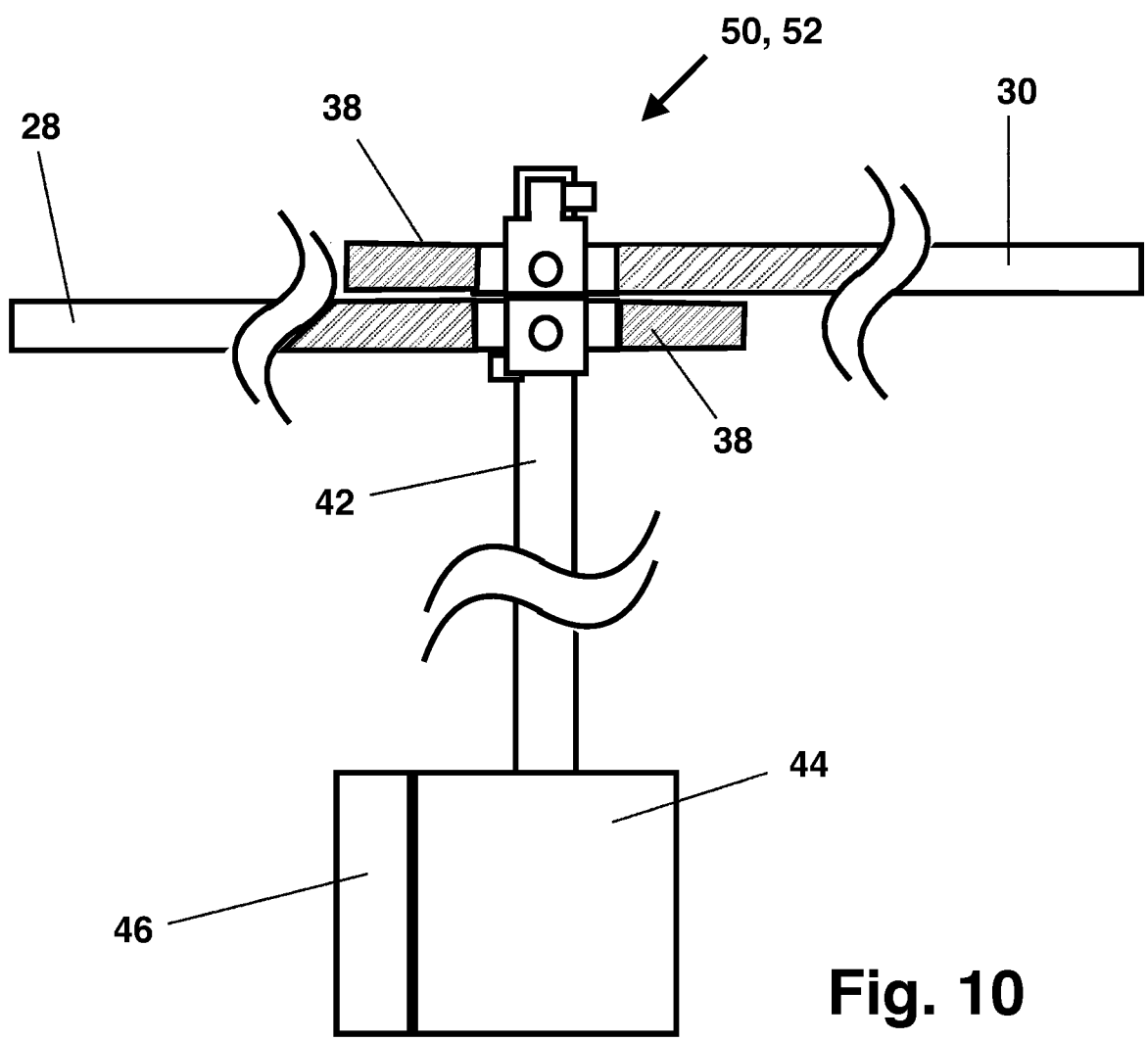
FIG. 10 is a schematic top view of the tail rotors of the fifth embodiment.

FIG. 10 shows a fifth embodiment where the first and second blades 28, 30 are not spaced apart and instead are immediately adjacent. In all other respects, the embodiment of FIG. 10 operates in the same manner as the embodiment of FIG. 9. The first and second blades 28, 30 of FIG. 10 will rotate in radial opposition, but when stopped at high aircraft forward speed will both assume the parked position shown by FIG. 4.

Figure 11:
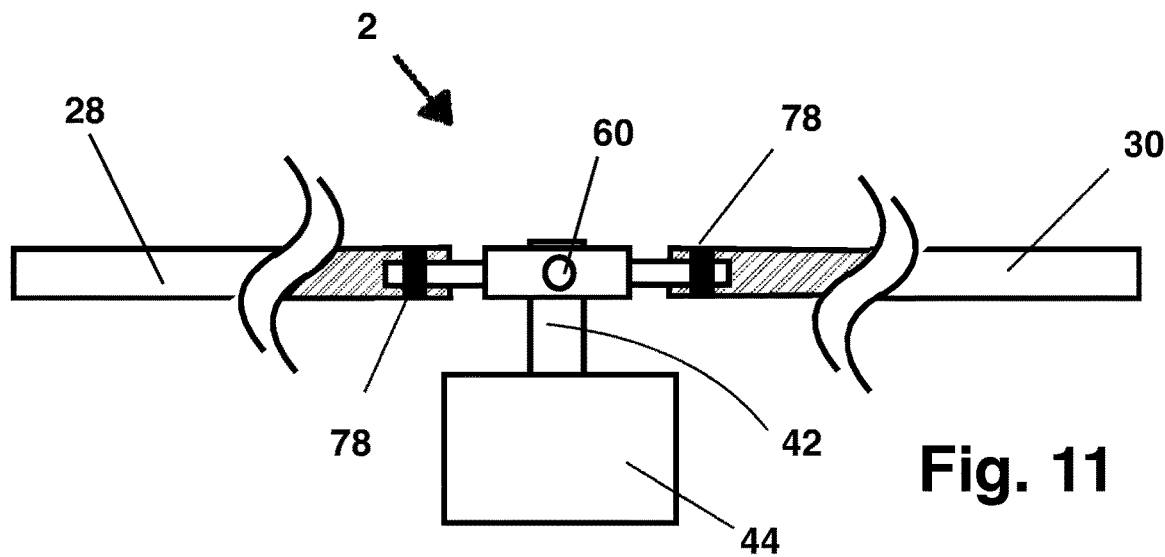
FIG. 11 is a cutaway top view of the tail rotor of the sixth embodiment.
Figure 12:
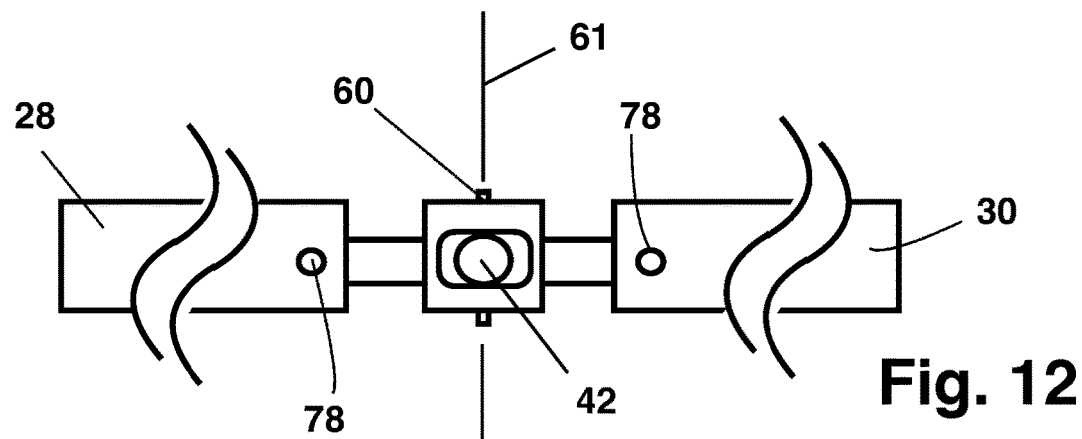
FIG. 12 is a side view of the tail rotor of the sixth embodiment in the operating position.
Figure 13:
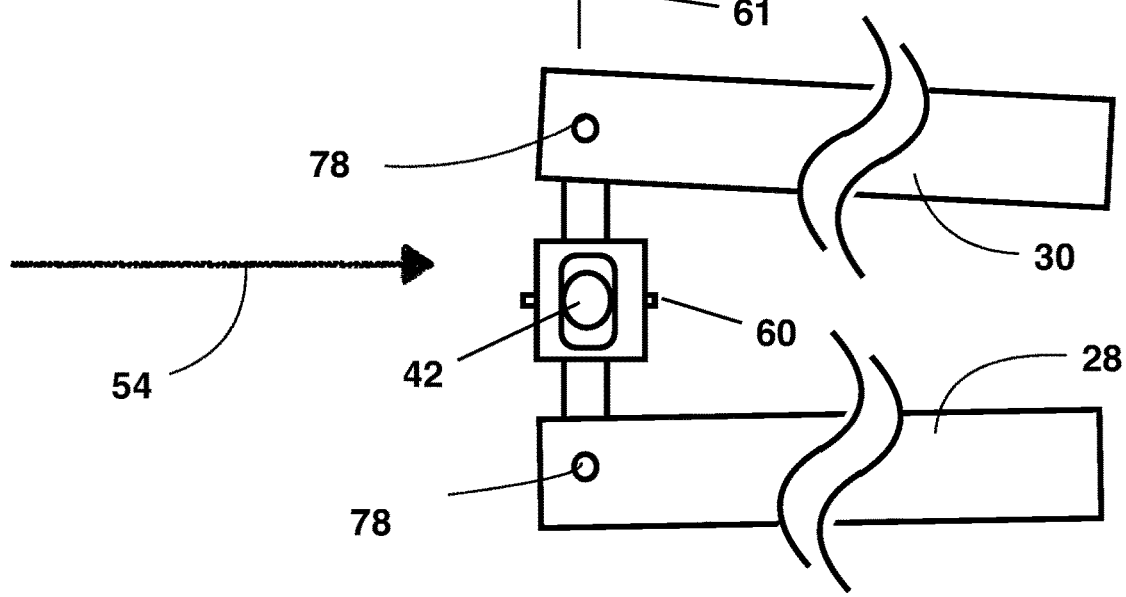
FIG. 13 is a side view of the tail rotor of the sixth embodiment in the parked position.

FIGS. 11, 12 and 13 show an embodiment providing a single parking tail rotor 2 that moves passively to a parked position, shown by FIG. 13. The parking tail rotor 2 of FIGS. 11, 12 and 13 is driven through drive shaft 42 by motor 44. The embodiment of FIGS. 11, 12 and 13 includes flapping hinge 60 and also includes lead-lag hinges 78, allowing the first and second blades 28, 30 to rotate normal to the flapping hinge axis 61. FIG. 11 is a detail cutaway top view view of the parking tail rotor 2 in the operating position when the first and second blades 28, 30 are rotating and balancing the torque of the main rotor 10. FIG. 12 is a side view of the first and second blades 28, 30 rotating under power from the tail rotor electric motor 44 so that the centrifugal force of the rotating first and second blades 28, 30 keeps the blades 26 in the extended, or operating, position. At high aircraft 4 forward speeds, the first and second blades 28, 30 slow and stop as power to the tail rotor electric motor 44 is cut. The relative wind 54 moves first and second blades 28, 30 to the parked position, shown by FIG. 13. The parking tail rotor 2 of the embodiment of FIGS. 11, 12 and 13 may include springs to urge first and second blades 28, 30 to the parked position. The force applied by the springs is overcome by the centrifugal force of the of the first and second blades 28, 30 when rotating under power.

Figure 14:
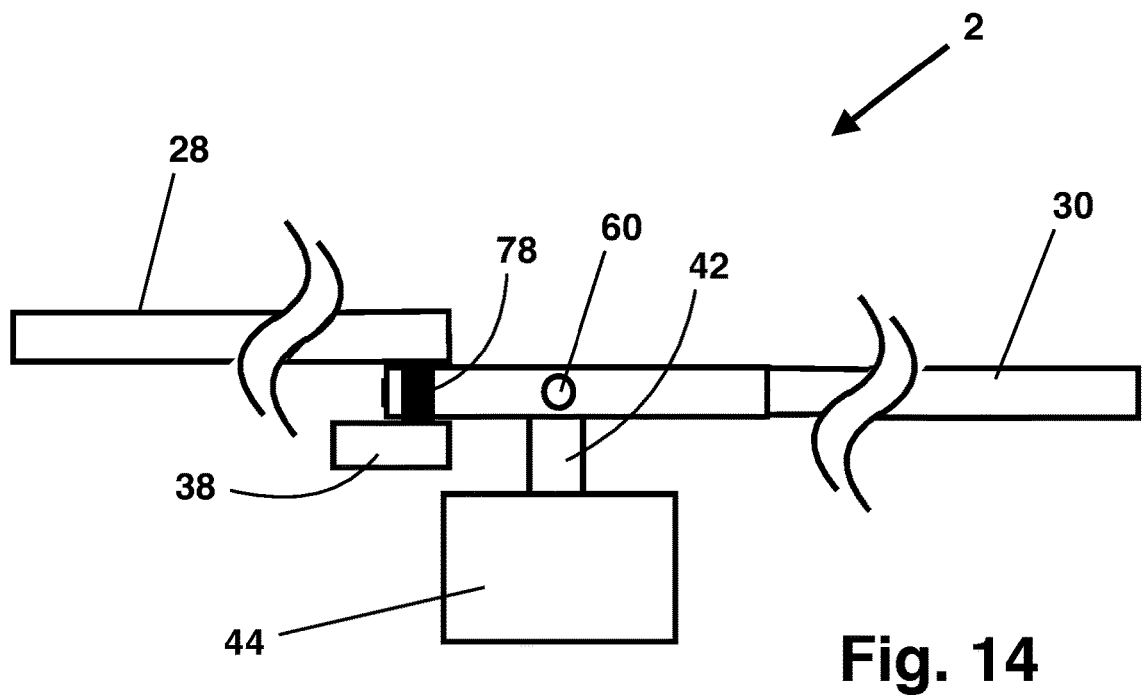
FIG. 14 is a top partial cutaway view with a rotor having two blades, with the blades rotating and joined by a lead-lag hinge.
Figure 15:
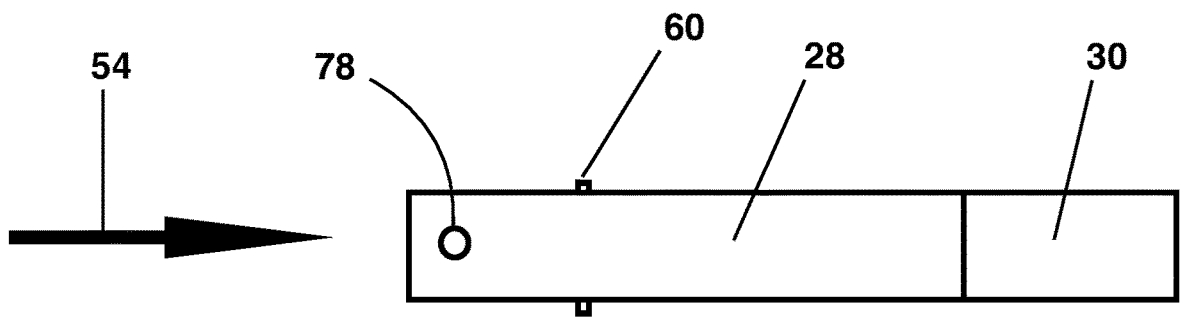
FIG. 15 is a side view of the rotor of FIG. 14 with the blades stopped in the parked position.

The embodiment shown by FIGS. 14 and 15 includes a parking tail rotor 2 having a first blade 28 and a second blade 30. FIG. 14 shows the parking tail rotor 2 in the deployed position when rotating to balance the torque of the main rotor 10. FIG. 15 shows first and second blades 28, 30 in the parked position to reduce drag. From FIG. 14, first blade 28 has a lead-lag hinge 78. Second blade 30 does not. First blade 28 is disposed on the outside of the second blade 30 from the hub 70 so that first blade 28 can rotate through 360 degrees independent of second blade 30 without interference by the tail rotor hub 70, drive shaft 32 or second blade 30. First blade 28 also has a counterweights 38 on the inside of the tail rotor hub 70 so that the center of mass of the first blade 28 plus the counterweights 38 coincides with a line passing through the center of mass of the second blade 30 and the hub 70. Because the centers of mass of the first and second blades 28, 30 falls on a line through the tail rotor hub 70, the first and second blades 28, 30 are balanced and without vibration when rotating at the design speed. When power is cut to the parking tail rotor 2, second blade 30 moves to the downwind position shown by FIG. 15 and turns the motor 44 with it. First blade 28 also turns to the downwind position shown by FIG. 15. The first blade 28 and the counterweight 38 may be shaped to reduce drag when the first and second blades 28, 30 are in the parked position, shown by FIG. 15.

Figure 16:
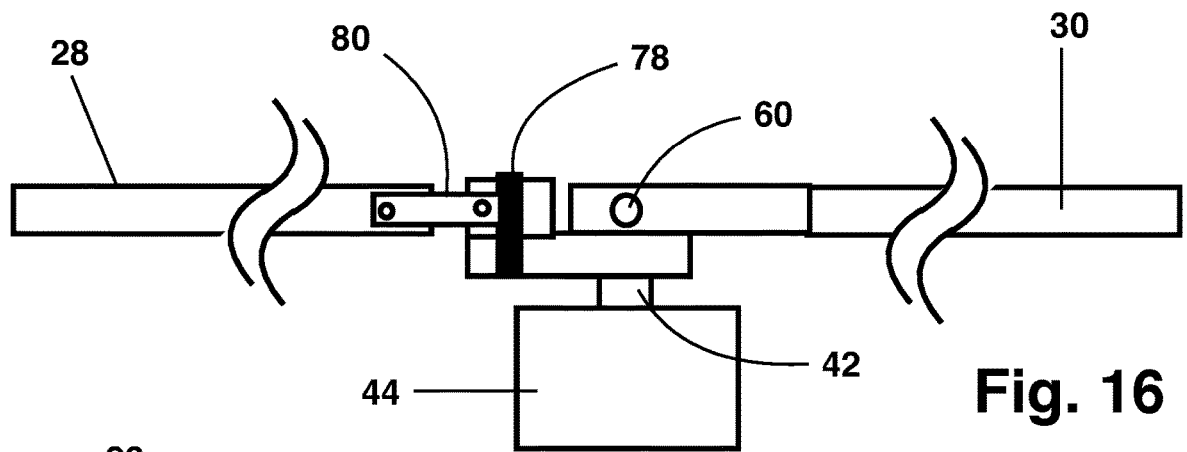
FIG. 16 is a top partial cutaway view of a rotor having two blades with the blades rotating and joined by a lead-lag hinge.
Figure 17:
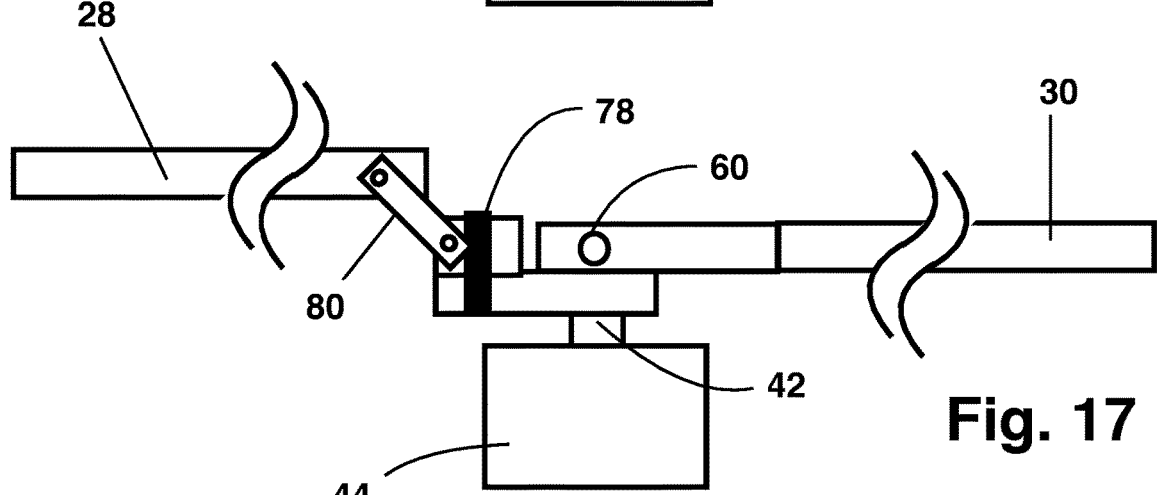
FIG. 17 is a top partial cutaway view of the rotor of FIG. 16 with the rotor stopping.
Figure 18:
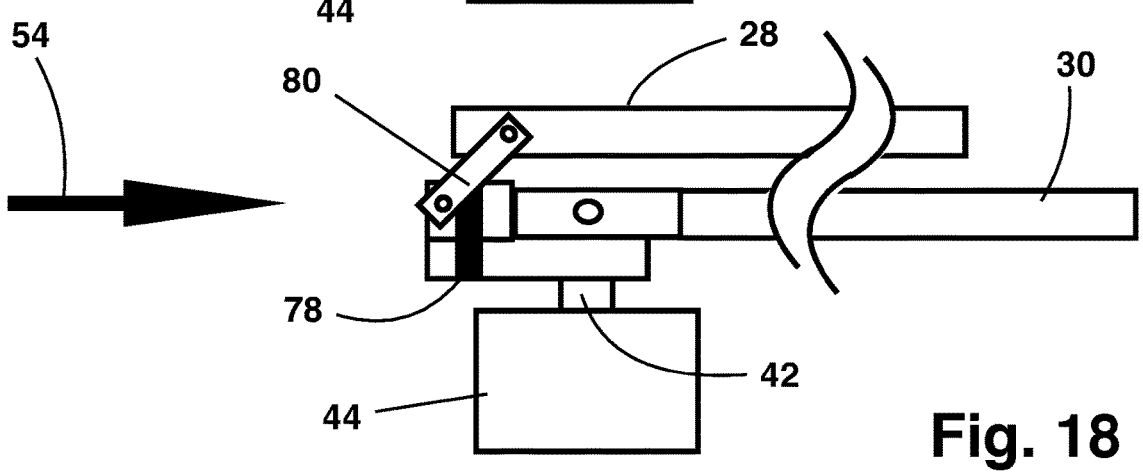
FIG. 18 is a to partial cutaway view of the rotor of FIGS. 16 and 17 with the rotor stopped and moved about the lead-lag hinge to the parked position.

The embodiment of FIGS. 16, 17 and 18 operates in a manner similar to that of FIGS. 14 and 15, but avoids the use of a counterweight 38. First blade 28 is attached to the lead-lag hinge 78 by a lifting link 74. At the design rotational speed, centrifugal force keeps first blade 28 in the deployed position (shown by FIG. 16) and the first blade 28 and second blade 30 are balanced. When the first and second blades 28, 30 slow, springs move the lifting link 80 and first blade 28 to a lifted position, shown by FIG. 17. When the first and second blades 28, 30 stop, second blade 30 rotates about the tail rotor axis of rotation 40 downwind to the parked position due to the relative wind 54. First blade 28 rotates around the lead-lag hinge 78 to the downwind, parked position, also shown by FIG. 18. A damper avoids excess motion of the first blade 28 when the motor 44 starts.

As noted above, all embodiments may include first and second blades 28, 30 of variable pitch or of fixed pitch. The flapping motion of each of the first and second blades 28, 30 about the flapping hinge 60 may be damped to prevent over-rapid excursion of the first and second blades 28, 30. The motion of the first and second blades 28, 30 about the flapping hinge 60 may be biased so that the blade span 36 of the first and second blades 28, 30 is normal to the tail rotor axis of rotation 40 when the first and second blades 28, 30 are rotating slowly or are stopped.

In this document and in the drawings, elements having the same name or element number have the same meaning unless the context requires otherwise.

The following is a list of numbered elements from the drawings and specification:

Parking tail rotor 2
Compound aircraft 4
Fuselage 6
Tail boom 8
Main rotor 10
Fixed wing 12
Vertical stabilizer 14
Horizontal stabilizer 16
Thruster propeller 18
Forward direction 20
Thruster propeller axis of rotation 22
Aircraft longitudinal axis 24
Tail boom landing gear 26
First blade 28
Second blade 30
Blade root 32
Blade tip 34
Blade span 36
Counterweight 38
Tail rotor axis of rotation 40
drive shaft 42
Tail rotor electric motor 44
Structural member 46
Thruster propeller drive shaft 48
First hub 50
Second hub 52
Relative wind 54
Blade surface 56
Aft direction 58
Flapping hinge 60
Flapping range of motion 62
Sleeve 64
First driving boss 66
Second driving boss 68
Driven boss 70
First synchronous motor 72
Second synchronous motor 74

Electrical clutch 76
Lead-lag hinge 78
Lifting link 80

What is claimed is:

1. A parking tail rotor apparatus for a rotary wing aircraft having a forward direction and an aft direction, the parking tail rotor apparatus comprising:
   a) a tail rotor hub and one or more tail rotor blades attached to the tail rotor hub, the tail rotor hub and one or more tail rotor blades being configured for rotation to balance a torque of a main rotor of the rotary wing aircraft;
   b) each of the one or more tail rotor blades having a blade root, a blade span and a blade tip, the blade root of each of the one or more tail rotor blades being attached to the tail rotor hub and configured to rotate with the tail rotor hub, the blade span extending from the blade root to the blade tip, the one or more tail rotor blades having a configuration to stop rotating and to move to a parked position when the rotary wing aircraft is flying in the forward direction, wherein the blade tip of each of the one or more tail rotor blades is aft of the tail rotor hub when the one or more tail rotor blades are in the parked position.

2. The parking tail rotor apparatus of claim 1 wherein the configuration of the one or more tail rotor blades to balance the main rotor torque comprises: a source of motive power, the source of motive power selectably rotating the one or more tail rotor blades, the one or more tail rotor blades providing a thrust to balance the main rotor torque when the source of motive power is rotating the one or more tail rotor blades.

3. The parking tail rotor apparatus of claim 2 wherein the rotary wing aircraft has a flight control surface and wherein the configuration of the one or more tail rotor blades to stop rotating during flight comprises: the source of motive power selectably not rotating the one or more tail rotor blades during flight of the rotary wing aircraft in the forward direction when the flight control surface has a sufficient control authority to balance the main rotor torque.

4. The parking tail rotor apparatus of claim 3 wherein the configuration of the one or more tail rotor blades to move to the parked position comprises: a relative wind applying a relative wind force to each of the one or more tail rotor blades when the rotary wing aircraft is flying in the forward direction and the source of motive power is not rotating the one or more tail rotor blades, the relative wind force being sufficient to move the one or more tail rotor blades to the parked position in a manner of a weathervane.

5. The parking tail rotor apparatus of claim 4, the one or more rotor blades comprising a single rotor blade, the apparatus further comprising: a counterweight attached to and rotatable with the tail rotor hub and the single rotor blade, the counterweight being disposed on an opposing second side of the tail rotor hub from the single rotor blade, the relative wind force on the single rotor blade being greater than the relative wind force on the counterweight when the rotary wing aircraft is flying in the forward direction and the source of motive power is not rotating the single rotor blade, the relative wind force on the single rotor blade being sufficient to move the single rotor blade to the parked position.

6. The parking tail rotor apparatus of claim 4 wherein the tail rotor hub comprises a first hub and a second hub, each of the first and second hubs being configured for rotation, the first and second hubs being in a spaced-apart relation lateral to the rotary wing aircraft, the one or more tail rotor blades comprising a first blade and a second blade, the first blade being attached to the first hub and configured for rotation with the first hub, the second blade being attached to the second hub and being configured for rotation with the second hub, the apparatus further comprises a first counterweight and a second counterweight, the first counterweight being disposed on an opposing second side of the first hub from the first blade, the second counterweight being disposed on the opposing second side of the second hub from the second blade the relative wind force on the first blade and the second blade being greater than the relative wind force on the first counterweight and the second counterweight when the rotary wing aircraft is flying in the forward direction and the source of motive power is not rotating the first blade and the second blade, the relative wind force on the first blade and the second blade being sufficient to move the first blade and the second blade to the parked position.

7. The parking tail rotor apparatus of claim 6 wherein the rotary wing aircraft has a horizontal stabilizer having a first and a second opposing horizontal stabilizer end, the first hub being disposed at the first horizontal stabilizer end, the second hub being disposed at the second horizontal stabilizer end.

8. The parking tail rotor apparatus of claim 7 wherein the first blade has a first blade radial orientation when the first blade is rotating and wherein the second blade has a second blade radial orientation when the second blade is rotating, the first blade and the second blade having a configuration so that the first blade radial orientation is equal to the second blade radial orientation.

9. The parking tail rotor apparatus of claim 8 wherein the configuration of the first and the second blades so that the first and second blade radial orientations are equal is that the first and second hubs are connected to the source of motive power by a common drive shaft, the source motive power being configured to selectably rotate the common drive shaft.

10. The parking tail rotor apparatus of claim 7 wherein the first blade has a first blade radial orientation when the first blade is rotating and wherein the second blade has a second blade radial orientation when the second blade is rotating, the first blade and the second blade having a configuration so that the first blade radial orientation is opposite to the second blade radial orientation.

11. The parking tail rotor apparatus of claim 10 wherein the configuration of the first and second blades so that the first blade radial orientation is opposite the second blade radial orientation comprising: a common drive shaft, the source of motive power being configured to selectably rotate the common drive shaft, the common drive shaft being connected to the first hub, the first blade being rotatable with respect to the common drive shaft, the common drive shaft having a first boss, the first boss engaging the first blade to rotate the first blade when the source of motive power is rotating the common drive shaft, the first boss not engaging the first blade when the source of motive power is not rotating the common drive shaft.

12. The parking tail rotor apparatus of claim 11 wherein the configuration of the first and second blades so that the first blade radial orientation is opposite the second blade radial orientation further comprising: the common drive shaft being connected to the second hub, the second blade being rotatable with respect to the common drive shaft, the common drive shaft having a second boss, the second boss engaging the second blade to rotate the second blade when the source of motive power is rotating the common drive shaft, the second boss not engaging the second blade when the source of motive power is not rotating the common drive shaft.

13. The parking tail rotor apparatus of claim 10 wherein the configuration of the first and second blades so that the first blade radial orientation is opposite the second blade radial orientation comprising: the source of motive power being a first electric motor and a second electric motor, the first electric motor being rotatably connected to the first blade, the second electric motor being rotatably connected to the second blade, the first and second electric motors being synchronized so that the first blade and the second blade rotate in radial opposition when the first and second electric motors are rotating the first and second blades.

14. The parking tail rotor apparatus of claim 4 wherein, the one or more rotor blades comprising a first blade and a second blade, the first and second blades being located axially adjacent one to another, the first and second blades having a configuration rotate in radial opposition when the source of motive power rotates the first and second blades, the configuration to rotate in radial opposition comprising: a common driveshaft attached for selectable rotation to the source of motive power, the first and second blades being configured for rotation by the common drive shaft, the common driveshaft having an axis of rotation, the first blade being rotatable with respect to the common driveshaft and the second blade about the axis of rotation, the common drive shaft having a first boss, the first boss engaging the first blade to rotate the first blade when the source of motive power is rotating the common drive shaft, the first boss not engaging the first blade when the source of motive power is not rotating the common drive shaft.

15. The parking tail rotor apparatus of claim 14 wherein the configuration of the first and second blades to rotate in radial opposition further comprising: the second blade being rotatable with respect to the common driveshaft about the driveshaft axis of rotation, the common drive shaft having a second boss, the second boss engaging the second blade to rotate the second blade when the source of motive power is rotating the common drive shaft, the second boss not engaging the second blade when the source of motive power is not rotating the common drive shaft.

16. The parking tail rotor apparatus of claim 4 wherein the one or more tail rotor blades comprise a first blade and a second blade, the first and second blades each having the blade root, blade span and blade tip, the blade roots of the first and second blades being attached to and rotatable with the tail rotor hub, the blade root of the first blade being attached to the tail rotor hub by a lead-lag hinge, the first blade being rotatable about the lead-lag hinge to the parked position when the rotary wing aircraft is flying in the forward direction and the source of motive power stops rotating the first and second blades, the blade tips of both of the first and second blades being aft of the tail rotor hub when the first and second blades are in the parked position.

17. The parking tail rotor apparatus of claim 16 wherein the blade root of the second blade is attached to the tail rotor hub by a lead-lag hinge, the second blade being rotatable about the lead-lag hinge to the parked position when the rotary wing aircraft is flying in the forward direction and the source of motive power stops rotating the first and second blades.

18. The parking tail rotor apparatus of claim 16 wherein the first and second blades are located directly opposite one to another on opposing sides of the tail rotor hub when the source of motive power is rotating the first and second blades, the apparatus further comprising: a lifting link, the first blade being attached to the lead-lag hinge by the lifting link, the lifting link being configured move the first blade axially away from the tail rotor hub when the source of motive power is not rotating the first and second blades so that the first blade does not interfere with the second blade or the tail rotor hub when the first and second blades are in the parked position.

19. A method of balancing the torque of the main rotor of a rotary wing aircraft, the method comprising:
    a) providing a tail rotor, the tail rotor having one or more tail rotor blades and a tail rotor hub, each of the one or more tail rotor blades having a blade root, a blade tip and a blade span between the blade root and the blade tip, the blade root being attached to the tail rotor hub and configured for rotation about the tail rotor hub, the one or more tail rotor blades having a parked position in which each of the one or more tail rotor blades is not rotating about the tail rotor hub and the blade tip of each of the one or more tail rotor blades is aft of the tail rotor hub, the one or more tail rotor blades Wade having a configuration to move to the parked position when the rotary wing aircraft is flying in the forward direction and each of the one or more tail rotor blades is not rotating;
    b) providing a control surface on the rotary wing aircraft, the control surface having an adequate control authority when the rotary wing aircraft is flying in a forward direction to balance the main rotor torque;
    c) flying the rotary wing aircraft in the forward direction so that the control surface has adequate control authority to balance the main rotor torque;
    d) stopping the one or more rotor blades from rotating.

20. The method of claim 19 wherein the configuration of the one or more rotor blades to move to the parked position comprises: the one or more rotor blades having a blade surface, a relative wind applying a relative wind force to the blade surface when the rotary wing aircraft is flying in the forward direction and one or more rotor blades are not rotating, the relative wind force being sufficient to move the one or more rotor blades to the parked position in a manner of a weathervane.

* * * * *